United States Patent [19]

Brubaker

[11] Patent Number: 4,699,454

[45] Date of Patent: Oct. 13, 1987

[54] FIBER OPTIC CONNECTOR

[75] Inventor: John L. Brubaker, Bolingbrook, Ill.

[73] Assignee: American Telephone and Telegraph Company, AT&T Bell Laboratories, Murray Hill, N.J.

[21] Appl. No.: 594,748

[22] Filed: Mar. 29, 1984

[51] Int. Cl.⁴ .............................................. G02B 6/36
[52] U.S. Cl. ................................ 350/96.20; 350/96.21
[58] Field of Search ............... 350/96.20, 96.21, 96.22, 350/96.15; 250/227, 551

[56] References Cited

U.S. PATENT DOCUMENTS

| 3,871,744 | 3/1975 | Bridger et al. | 350/96 C |
|---|---|---|---|
| 3,904,269 | 9/1975 | Lebduska et al. | 350/96 C |
| 4,046,454 | 9/1977 | Pugh, III | 350/96 C |
| 4,075,477 | 2/1978 | Hanson | 350/96.20 |
| 4,081,208 | 3/1978 | Meade | 350/96.20 |
| 4,183,619 | 1/1980 | Makuch | 350/96.21 |
| 4,184,070 | 1/1980 | McBride, Jr. | 250/227 |
| 4,190,316 | 2/1980 | Malsby et al. | 350/96.21 X |
| 4,217,030 | 8/1980 | Howarth | 350/96.20 |
| 4,225,213 | 9/1980 | McBride, Jr. et al. | 350/96.20 |
| 4,247,164 | 1/1981 | Mannschke | 350/96.20 |
| 4,285,572 | 8/1981 | Beaudett et al. | 350/96.20 |

(List continued on next page.)

FOREIGN PATENT DOCUMENTS

| 0032340 | 3/1977 | Japan | 350/96.21 |
|---|---|---|---|
| 0050737 | 4/1977 | Japan | 350/96.21 |
| 0130141 | 10/1979 | Japan | 350/96.21 |
| 0008108 | 1/1981 | Japan | 350/96.21 |
| 0034514 | 2/1982 | Japan | 350/96.21 |
| 0109908 | 7/1982 | Japan | 350/96.21 |
| 1538058 | 11/1975 | United Kingdom . | |
| 2015766 | 9/1979 | United Kingdom . | |
| 2032130 | 4/1980 | United Kingdom . | |
| 2098354 | 11/1982 | United Kingdom . | |

OTHER PUBLICATIONS

T. E. Bell, "Optical Computing: A Field in Flux", *IEEE Spectrum*, Aug. 1986, p. 39.

K. F. Ephraim et al., "Transceiver Module Assembly", *IBM Technical Disclosure Bulletin*, vol. 22, No. 5, (Oct. 1979), pp. 2077-2078.

A. H. Cherin et al., "An Injection Molded Splice Connector with Silicon Chip Insert for Joining Optical Fiber Ribbons", *Optical Fiber Transmission II*, (Feb. 22-24, 1977, Williamsburg, Va.), pp. WA7-1 to WA7-4.

C. M. Miller, "Optical Fiber Splicing", *Optical Fiber Transmission II*, (Feb. 22-24, 1977, Williamsburg, Va.), pp. WA3-1 to WA3-6.

F. P. Cefarelli et al., "Optical Circuit Module Connector", *IBM Technical Disclosure Bulletin*, vol. 21, No. 4, (Sep. 1978), pp. 1568-1570.

J. Petterson, Jr., "A Drop-In Solution for System Design", *Photonics Spectra*, vol. 16, No. 11, (Nov. 1982), pp. 47-52.

(List continued on next page.)

Primary Examiner—William L. Sikes
Assistant Examiner—Akm E. Ullah
Attorney, Agent, or Firm—David Volejnicek

[57] ABSTRACT

Disclosed is an electro-optical component package (12), arranged as a dual in-line pin (DIP) package, and a socket (13) therefor. Connector pins (17) extending from the package establish electrical and optical contact to the package with mating connector receptacles (19) of the socket. Each pin and receptacle has a metallic body (41,26) for establishing electrical connection between the pin and receptacle when the two are mated. Each body defines a passageway (42,27) through which extends an optical fiber (30,21). When the bodies of a pin and receptacle are mated, the optical fibers extending therethrough are optically coupled. The receptacle includes a cup member (39) that is positioned loosely and movably in its passageway. The cup member defines a passageway (37) by which it mounts around the end of the receptacle's fiber. When the pin and receptacle are mated, the cup member receives and mates the end portion (51) of the pin, thereby aligning the ends (57,46) of the receptacle's and pin's fibers. A coiled spring (36) positioned in the receptacle's passageway around the receptacle's fiber urges the cup member against the end portion of the pin.

40 Claims, 5 Drawing Figures

U.S. PATENT DOCUMENTS

| | | | |
|---|---|---|---|
| 4,295,707 | 10/1981 | Nakai et al. | 350/96.20 |
| 4,309,071 | 1/1982 | Prunier | 350/96.21 |
| 4,310,218 | 1/1982 | Karol | 350/96.21 |
| 4,312,564 | 1/1982 | Cefarelli et al. | 350/96.22 |
| 4,320,938 | 3/1982 | Gunnerson et al. | 350/96.21 |
| 4,322,127 | 3/1982 | Comerford | 350/96.21 |
| 4,325,607 | 4/1982 | Carlsen | 350/96.21 |
| 4,327,964 | 5/1982 | Haesly et al. | 350/96.20 |
| 4,330,172 | 5/1982 | Monaghan et al. | 350/96.21 |
| 4,336,977 | 6/1982 | Monaghan et al. | 350/96.20 |
| 4,339,171 | 7/1982 | Makuch et al. | 350/96.20 |
| 4,341,439 | 7/1982 | Hodge | 350/96.22 |
| 4,352,542 | 10/1982 | Tydings | 350/96.21 |
| 4,353,620 | 10/1982 | Schultz | 350/96.20 |
| 4,354,731 | 10/1982 | Mouissie | 350/96.20 |
| 4,367,011 | 1/1983 | Monaghan | 350/96.20 |
| 4,368,948 | 1/1983 | Despouys | 350/96.20 |
| 4,370,022 | 1/1983 | Johnson | 350/96.21 |
| 4,371,233 | 2/1983 | Masuda | 350/96.18 |
| 4,373,777 | 2/1983 | Borsuk et al. | 350/96.20 |
| 4,373,778 | 2/1983 | Adham | 350/96.20 |
| 4,377,322 | 3/1983 | Ransley et al. | 350/96.2 |
| 4,380,366 | 4/1983 | Franken et al. | 350/96.21 |
| 4,383,732 | 5/1983 | Dalgoutte et al. | 350/96.20 |
| 4,386,268 | 5/1983 | Kock | 350/96.20 X |
| 4,397,522 | 8/1983 | Parr | 350/96.21 |
| 4,398,793 | 8/1983 | Ohta et al. | 350/96.20 |
| 4,411,491 | 10/1983 | Larkin et al. | 350/96.21 |
| 4,427,879 | 1/1984 | Becher et al. | 350/96.15 X |
| 4,433,898 | 2/1984 | Nasiri | 350/96.20 X |
| 4,478,485 | 10/1984 | Khoe et al. | 350/96.20 |
| 4,479,696 | 10/1984 | Lubin et al. | 350/96.20 |
| 4,486,072 | 12/1984 | Roberts | 350/96.21 |
| 4,549,783 | 10/1985 | Schmachtenberg | 350/96.21 |
| 4,597,631 | 7/1986 | Flores | 350/96.22 |

OTHER PUBLICATIONS

P. K. Runge et al., "Precision Transfer Molded Single Fiber Optic Connector and Encapsulated Connectorized Devices", *Optical Fiber Transmission II*, (Feb. 22-24, 1977, Williamsburg, Va.), pp. WA4-1 to WA4-4).

Photodyne, Inc., Cat. C1983, pp. 15 and 40.

C. M. Schroeder, "Accurate Silicon Spacer Chips for an Optical-Fiber Cable Connector", *The Bell System Technical Journal*, vol. 57, No. 1, (Jan. 1978), pp. 91-97.

C. M. Schroeder, "Accurate Silicon Spacer Chips for an Optical-Fiber Cable Connector", *Optical Fiber Transmission II*, (Feb. 22-24, 1977, Williamsburg, Va.), pp. WA6-1 to WA6-4.

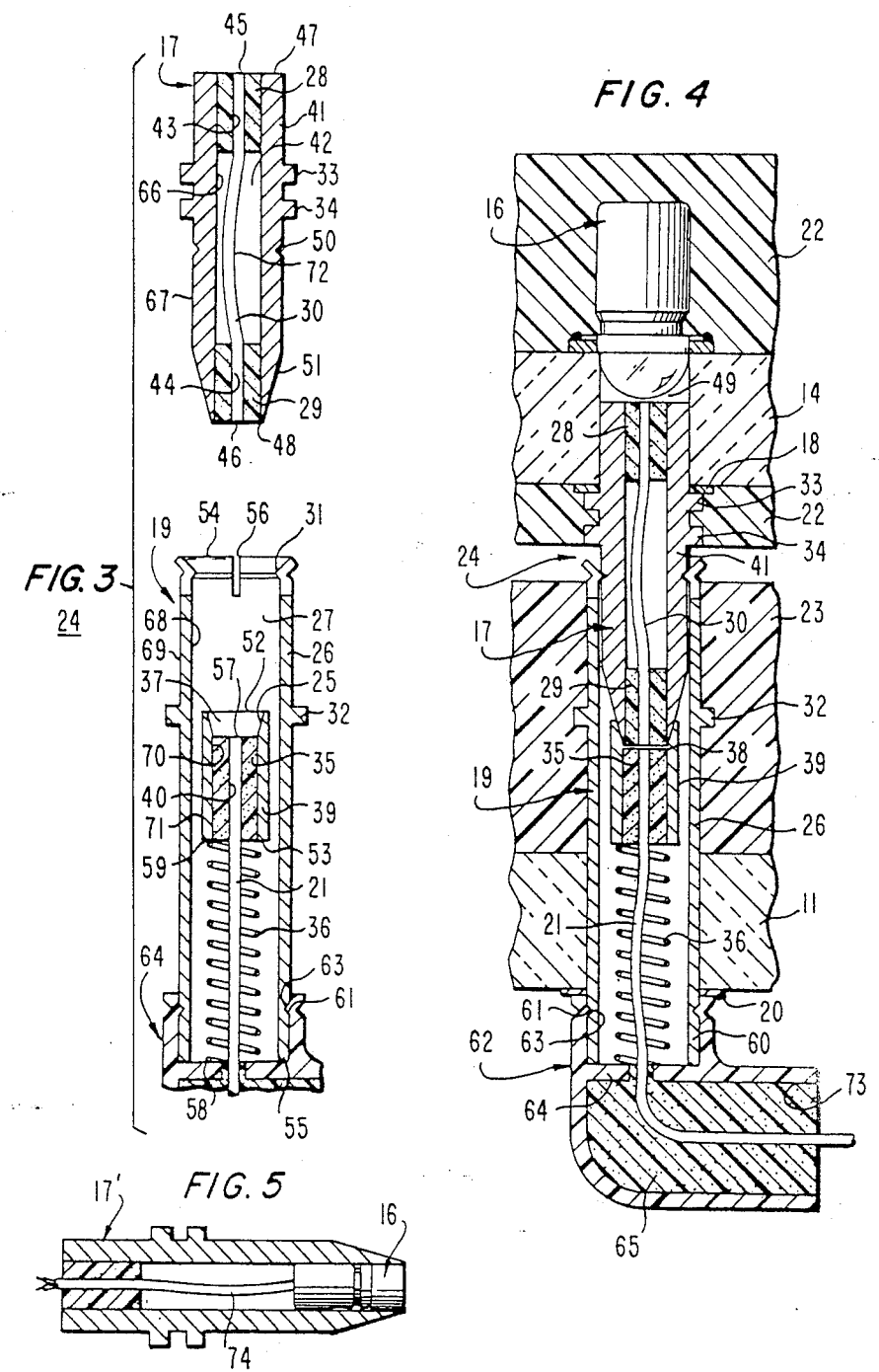

FIBER OPTIC CONNECTOR

TECHNICAL FIELD

The invention relates to the field of fiber optics in general, and to connectors for optical fibers in particular.

BACKGROUND OF THE INVENTION

In many areas of communications, processing, and control, the use of fiber optics is supplementing or supplanting the use of electronics. One example of this is in telecommunications, where the use of lightwave-conducting optical fibers is replacing the use of electrical-signal-carrying metallic conductors. The advantages derived from use of fiber optics include lower bulk and lower cost of transmission media, much higher speeds of communication, lesser attenuation per unit of distance with consequent need for fewer repeaters, and the capability of carrying many more communications via a single conductor.

As in electronics technology, it is necessary in lightwave technology to provide mechanisms for connecting conductors to each other and for connecting conductors to various devices that transmit, receive, or process signals. Unlike the field of electronics, however, where the connection of wires and printed board conductors to each other and to devices has been a relatively simple matter, interconnection of optical fibers and connection thereof to devices has been relatively difficult to achieve, and has required the use of complex, cumbersome, and bulky connectors to obtain satisfactory physical and optical characteristics of interconnection. In particular, the alignment of adjacent ends of connected optical fibers in a manner that was precise and could withstand the mechanical stresses and other rigors of ordinary use has proven to be difficult, complex, bulky, and expensive to achieve.

Inter alia, the complexity of satisfactorily-functioning optical connectors has limited their miniaturization. Thus, while the electronic art has commonly utilized connectors, and device packages and sockets therefor, containing tens or hundreds of closely-spaced miniaturized (on the orders of hundreds of an inch) pins and pin receptacles to establish electrical interconnection, analogous miniaturized interconnection capability has so far been impossible or impractical to achieve in the optical art.

Furthermore, many devices in the optical art are electro optical in nature, either requiring electricity as the source of their power or converting light signals into electrical signals and vice versa. Such devices therefore require that both optical and electrical connection be made thereto. The prior art has taken the approach of providing the two types of connections independently, via separate connectors. While such independent connectors have sometimes been aggregated into a single connector assembly to provide for the simultaneous making or breaking of both the electrical and optical connections, the connections have nevertheless been established by separate connectors within the assembly, resulting in the use of relatively numerous connectors and hence relatively bulky and expensive connector assemblies.

SUMMARY OF THE INVENTION

It is these and other disadvantages of the prior art that the present invention is directed to solving. According to the invention, a device package comprises at least one electro-optical device, a plurality of half-connectors coupled to the device, for making electrical and optical connections, and a support member for mounting the device and half-connectors. The package is for mounting on a socket that has a plurality of half-connectors, and the half-connectors of the package are all arranged to mate with the half-connectors of the socket in order to make all electrical and optical connections to the package through the socket. Further according to the invention, a socket for an electro-optical package comprises a support member mounting a plurality of half-connectors arranged to mate with all of the half-connectors of the package, for electrically or optically coupling with the half-connectors of the package in order to make all electrical and optical connections to the package through the socket. Suitable half-connectors include pins and pin receptacles for coupling optical elements such as optical fibers carried by the pins and the receptacles.

A pin for coupling an optical fiber to an optical element carried by a receptacle for receiving the pin includes an elongated body portion. At one of its ends the body portion defines a conical portion that tapers toward the one end of the body portion. Along its length the body portion defines a passageway therethrough for the optical fiber. The optical fiber extends nonlinearly through the passageway, and in an illustrative embodiment only extends even with the length of the passageay. Elastomeric means position the optical fiber in the passageway. The body portion of the pin is preferably a one-piece unit, and preferably comprises electrically conductive material for establishing electrical connection. Alternatively in an illustrative embodiment, the fiber is replaced with an electro-optical device that is mounted in the passageway at the conical end of the body portion, and that makes an electrical contact with the conductive body portion. An electrical conductor extends through the passageway and makes all other electrical contacts with the device.

A receptacle for coupling an optical fiber to an optical element carried by a pin receivable by the receptacle includes an elongated body portion. Along its length the body portion defines a passageway therethrough for the optical fiber. An alignment member is loosely movably positioned in the passageway. The alignment member defines a passageway therethrough for fixedly receiving an end portion of the optical fiber. At one of its ends the alignment member defines a conical portion of its passageway. The conical portion opens outwardly from the alignment member for engaging the pin. The alignment member serves to align the optical fiber with the optical element. Also included in the receptacle are means for urging the alignment member against the pin. The body portion of the receptacle also preferably comprises electrically conductive material for establishing electrical connection.

A pin and a receptacle together form a connector for coupling optical elements carried thereby. Advantageously, the pins and receptacles of this invention are of simple configuration. Hence, they are suited for being made in miniature form, for example with diameters on the orders of hundredths of an inch. Yet the configuration of these pins and receptacles is such that it achieves proper alignment of adjacent ends of connected optical fibers, and does so in a manner that can withstand the mechanical stresses and other rigors of ordinary use.

Furthermore, the pins and sockets can serve the dual function of establishing both electrical and optical connections, without increasing their complexity or bulk, thus eliminating the need for separate electrical and optical connectors.

Because the pins and receptacles are suited for being made in miniature form, they are suited for use as half-connectors in electro-optical device packages and sockets therefor. Such packages and sockets allow electro-optical devices to be packaged in configurations analogous to those that have been tried and proven advantageous in the electronics field. These packages and sockets allow multiple optical and also electrical connections to be made easily and simultaneously, simply by pushing the packages into their sockets, and to be broken easily and simultaneously, simply by pulling the packages out of their sockets. And because the functions of making both an electrical and an optical connection may be achieved in these packages and sockets by a single pin and receptacle, these packages and sockets may either use relatively fewer pins and receptacles for the number of connections made, or alternatively may make relatively more connections with the available number of pins and receptacles than prior art devices.

These and other advantages and features of the present invention will become apparent from the following description of illustrative embodiments of the invention taken together with the drawing.

BRIEF DESCRIPTION OF THE DRAWING

FIG. 3 is a sectional exploded view of a pin and a receptacle of the package and the socket of FIGS. 1 and 2;

FIG. 4 is a sectional view of a pin and a receptacle of FIGS. 1 and 2 along the line 3—3 of FIG. 1; and FIG. 5 is a sectional view of an alternative embodiment of a pin of FIGS. 1 and 2.

DETAILED DESCRIPTION

Figure 1:
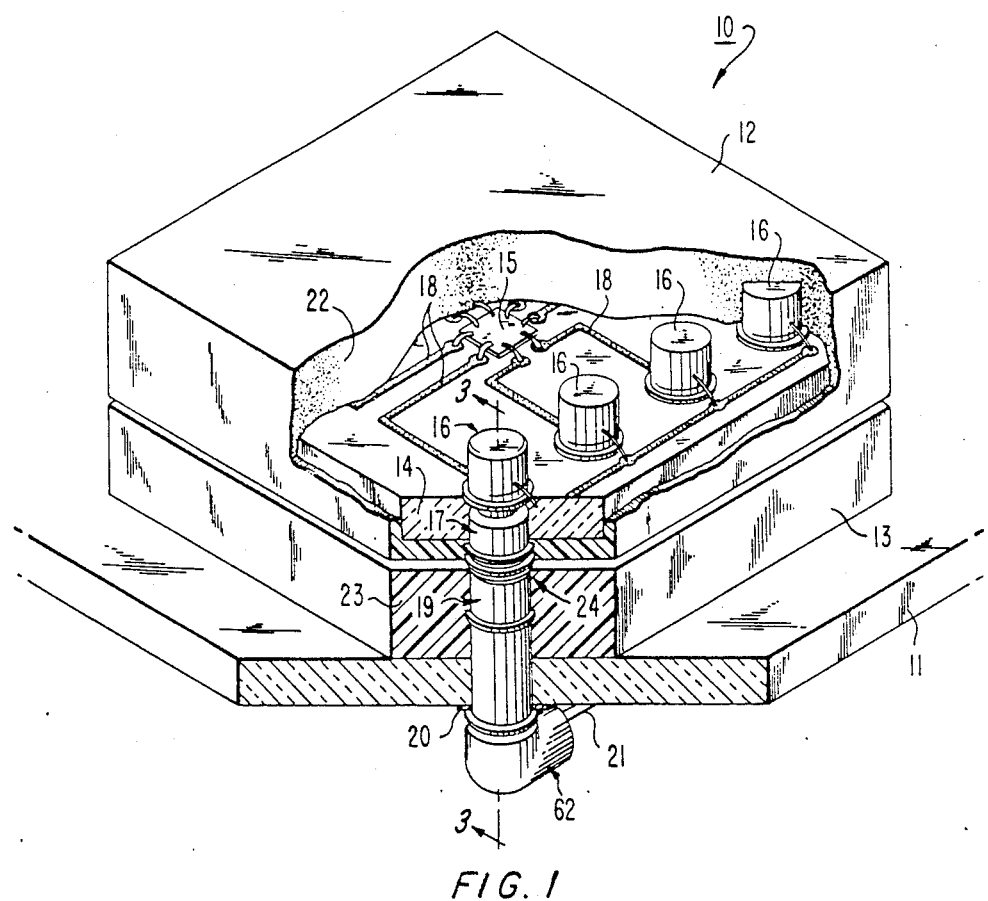
FIG. 1 shows a portion of a circuit pack, including a cut-away view of an illustrative embodiment of a device package and a socket mounting the package.
Figure 2:
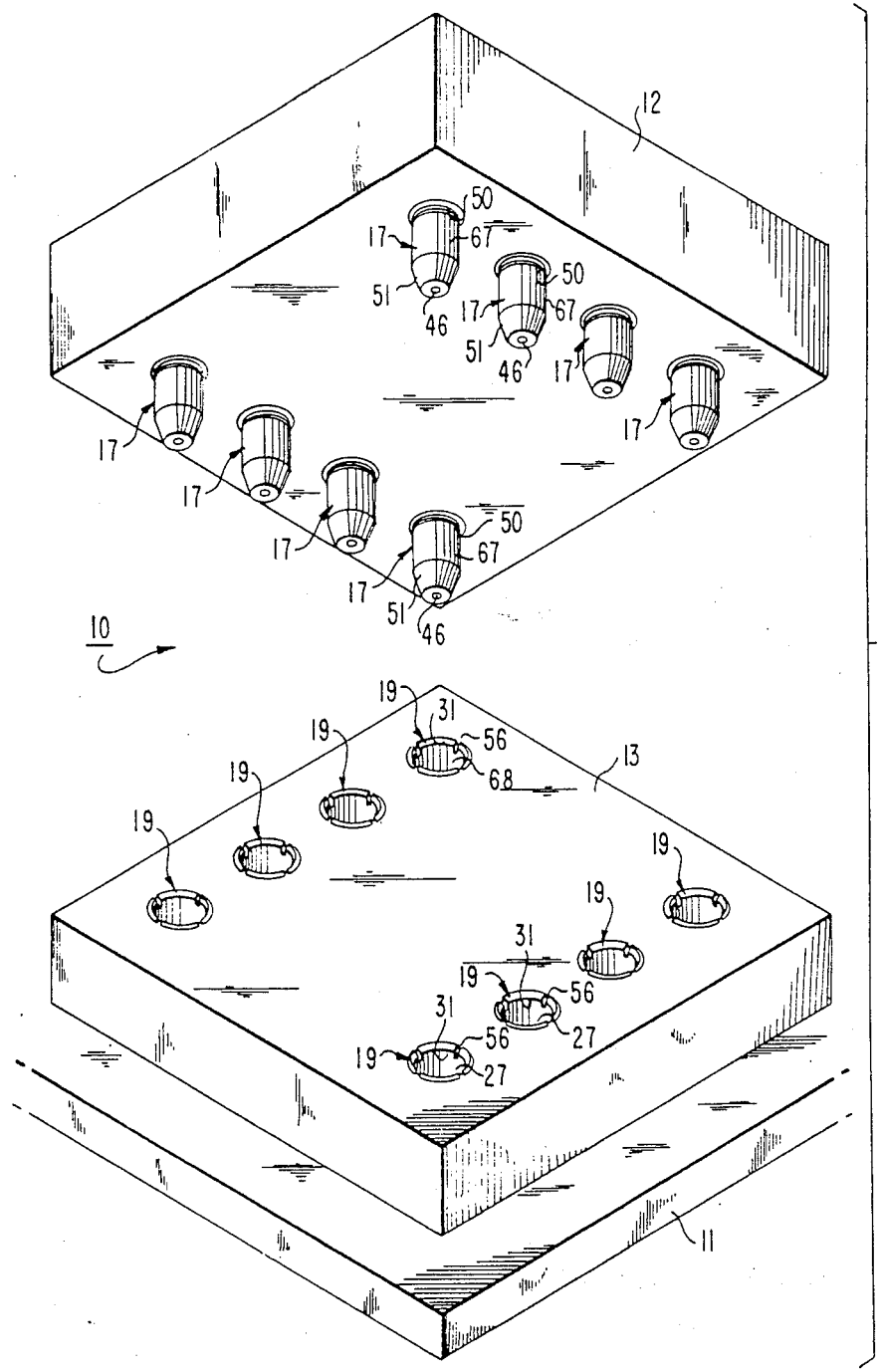
FIG. 2 shows the socket and the package of FIG. 1 dismounted.

Turning now to the drawing, FIGS. 1 and 2 show a portion of a circuit pack 10. The circuit pack 10 includes a circuit board 11, a plurality of device packages, and sockets for the packages. For ease of illustration, only one device package 12 and its associated socket 13 are shown in FIG. 1. FIG. 1 presents a cut-away view of the circuit pack 10, including of the socket 13 and of the device package 12 mounted thereon. FIG. 2 shows the device package 12 dismounted from the socket 13.

The socket 13 is fixedly mounted to the circuit board 11, and the device package 12 is removably mounted in the socket 13. As FIG. 2, which shows the package 12 and socket 13 of FIG. 1 dismounted, illustrates, the illustrative device package 12 is configured for mounting purposes in the manner of a dual in-line pin (DIP) device package: two parallel rows of equally-spaced pins 17 extend outwardly in one direction from the device package 12. Alternatively, any desirable configuration of pins may be used, for example a single row of pins, a circle of pins, or a matrix of pins.

The socket 13 is arranged in a reciprocal manner to the device package 12 in order to mount the device package 12. The illustrative socket 13 has two parallel rows of equally-spaced receptacles 19 for the pins 17 of the device package 12. The receptacles 19 are arranged such as to receive and engage the pins 17.

As FIG. 1 suggests, the pins 17 of the package 12 mate with corresponding receptacles 19 of the socket 13 by being inserted therein. A pin 17 and receptacle 19 together form a connector 24. The pin 17 and the receptacle 19 each are a half-connector of the connector 24. To mount the package 12 in the socket 13, the rows of pins 17 are positioned over the rows of receptacles 19 and pressure is applied to push the pins 17 into the receptacles 19. The package 12 is dismounted from the socket 13 by pulling on the package 12 to disengage the pins 17 from the receptacles 19.

The socket 13 is mounted to the circuit board 11 in a conventional manner. For example, the receptacles 19 extend outwardly from the socket 13 through holes in the circuit board 11 and are soldered to electrical conductors 20 carried by the circuit board 11.

The device package 12 is an electro-optical device package. Devices included therein are electrical devices 15 which are, for example, semiconductor integrated circuits, and electro-optical devices 16 which are, for example, optical detectors or optical generators such as light emitting diodes. The device package 12 may also include purely optical devices. The package 12 comprises a substrate 14 which acts as a support member for the electrical devices 15, the electro-optical devices 16, and the pins 17. The devices 15 and 16 and the pins 17 are mounted to the substrate 14. The pins 17 provide both electrical and optical connections to the package 12. The pins 17 are optically linked with the electro-optical devices 16. The pins 17 and devices 16 are electrically connected, via conductors 18 carried by the substrate 14, to the electrical devices 15 and optionally to each other. The conductors 18 may be soldered to the devices 15 and 16 and to the pins 17. The pins 17 are mounted to the substrate 14 in any one of a number of ways, for example by being press-fitted into holes in the substrate 14. The electro-optical devices 16 are mounted in or over the same holes in the substrate 14, in proximity to the ends of the pins 17, to establish an optical link therewith. The substrate 14 and the devices mounted thereon are encapsulated, for example by an injection molding process, by encapsulating material 22 such that the pins 17 protrude from the encapsulation.

The pins 17 make electrical and optical connection with electrical conductors 20 and and optical fibers 21, respectively, that are carried by the circuit board 11. The connection is accomplished through the receptacles 19 of the socket 13. Electrical contact is established by the bodies of the pins 17 and the receptacles 19. The bodies of both the pins 17 and the receptacles 19 are made of electrically conductive material, such as metal. Optical contact is established by optical elements, such as optical fibers, that are carried in the bodies of the pins 17 and the receptacles 19, as will be made clear further below.

The socket 13 comprises the receptacles 19 and a support member 23 for the receptacles 19. The receptacles 19 are mounted to and extend through the support member 23. The socket 13 is formed by encapsulating, again for example by an injection molding process, the receptacles 19 in an encapsulating material that forms the support member 23.

The portion of each receptacle 19 that mates with a pin 17 is positioned substantially inside the support member 23 and extends to one surface thereof. The portion of each receptacle 19 that mounts the socket 13 to the circcuit board 11 extends outwardly from the other surface of the support member 23. The receptacles 19 make electrical contact with electrical conductors 20 of the circuit board 11 by being soldered thereto, for example. Optical fibers 21 of the circuit board 11 extend into the bodies of the receptacles 19, one fiber 21 into each receptacle 19, for optical coupling to the optical fibers that extend through the bodies of the pins 17.

Details of the interconnection between a pin 17 and a receptacle 19 of FIGS. 1 and 2 and the structural details of the connector 24 formed thereby are shown in FIGS. 3 and 4. FIG. 4 presents a cross-sectional view through the connector 24 of FIG. 1, along the line 3—3 while FIG. 3 is a cross-sectional view of the connector 24 showing the pin 17 and socket 19 disengaged. Reference will now be made to the FIGS. 3 and 4.

As FIG. 3 shows, the connector 24 comprises two half-connectors: the pin 17 and the socket 19. The pin 17 comprises an elongated cylindrical rigid metallic body portion 41 that defines a passageway 42 therethrough axially along its length. An optical fiber 30 extends through, and even with the length of, the passageway 42. Preferably, the diameter of the passageway 42 is greater than the diameter of the optical fiber 30, and the fiber 30 extends nonlinearly through the passageway 42; the fiber 30 forms a slight bow 72 along its length to provide slack that can accommodate changes in length of the body portion 41 that result, for example, from thermal expansion.

Fixedly positioned in the passageway 42 at the ends 47 and 48 of the body portion 41 and attached to the inner surface 66 of the body portion 41 are elastomeric, preferably plastic, members 28 and 29. Each member 28 and 29 defines a hole 43 and 44, respectively, therethrough axially along the length of the body portion 41. The holes 43 and 44 fixedly receive the end 45 and 46 portions, respectively, of the optical fiber 30. The ends 45 and 46 of the fiber 30 are flush with the ends 47 and 48, respectively, of the body portion 41.

The outer surface 67 of the body portion 41 defines a truncated cone 51 at one end 48 thereof. The cone 51 is symmetrical about the axis of the body portion 41, and hence about the passageway 42, and tapers toward the end 48. The conical shape of the end 48 portion of the body portion 41 helps to guide the pin 17 into the receptacle 19.

The outer surface 67 of the body portion 41 also defines a pair of closely-spaced annular flanges 33 and 34. As FIG. 4 shows, the flange 34 provides a hold for the encapsulant 22. The flange 33 serves to control and limit insertion of the pin 17 into the substrate 14. As FIG. 4 shows, the pin 17 extends only part way into hole of the substrate 14. The electro-optical device 16 is positioned in and above the same hole of the substrate 14 adjacent the pin 17 and is separated from the pin 17 by an air gap 49. The gap 49 provides an optical link between the optical fiber 30 and the device 16 yet prevents contact between the pin 17 and the device 16 and hence protects the device 16 and the end 45 of the fiber 30 from damage. The flange 33 insures that the gap 49 is maintained. This function is again shown in FIG. 4. The flange 33 also serves as an electrical contact and solder ring for the pin 17 and a conductor 18 of the substrate 14.

Between the cone 51 and the flanges 33 and 34, the outer surface 67 of the body portion 41 defines an annular notch 50. This notch 50 is engaged by the receptacle 19, as shown in FIG. 4, to secure the pin 17 in the receptacle 19.

An alternative embodiment of the pin 17, designated by the numeral 17', is shown in FIG. 5. The pin 17' also comprises the body portion 41 as described above. However, the optical element mounted within the passageway 42 of the body portion 41 is not the optical fiber 30 but the electro-optical device 16. As FIG. 5 shows, the electro-optical device is mounted in the passageway 42 at the end 48 of the body portion 41. Thus the device 16 is optically coupled directly, without aid of the optical fiber 30, to the receptacle 19 when the pin 17' and receptacle 19 are mated. A conductor extends from the device 16 through the passageway 42 for making an electrical connection to the device 16. A second electrical connection may be made to the device 16 via the physical contact between the device 16 and the body portion 41.

Returning to a consideration of FIGS. 3 and 4, like the pin 17, the receptacle 19 comprises an elongated cylindrical rigid metallic body portion 26 that defines a passageway 27 therethrough axially along its length. An end 57 portion of the optical fiber 21 extends into the passageway 27. The diameter of the passageway 27 is generally at least as great as the diameter of the part of the body portion 41 of the pin 17 between the end 48 and the notch 50, to enable the passageway 27 to receive that part of the body portion 41.

The internal surface 68 of the body portion 26 defines at one end 54 of the body portion 26 an annular protrusion 31 that constricts the passageway 27. The protrusion 31 engages the notch 50 of the pin 17 when the pin 17 and receptacle 19 are mated. Slits 56, one of which is shown in FIGS. 3 and 4, in the body portion 26 at the end 54 allow passageway 27 to expand at the protrusion 31 in order to receive and pass over the body portion 41 of the pin 17 to the notch 50.

The outer surface 69 of the body portion 26 defines an annular flange 32 which provides a hold for the encapsulant that forms the support member 23, fixedly mounting the receptacle 19 to the support member 23 and preventing the end 54 of the body portion 26 from being pushed into or further withdrawn from the support member 23. This is illustrated in FIG. 4.

Loosely movably positioned within the passageway 27 is an oval cup member 39. The cup member 39 defines a passageway 37 axially therethrough which is substantially parallel to the passageway 27 of the body portion 26. At one end 52 of the cup member 39 the passageway 27 takes the shape of a truncated cone 25. The cone 25 is symmetrical about the axis of the cup member 39, and hence about the passageway 27, and opens outwardly from the end 52 of the cup member 39. Filling the passageway 27 but for the cone 25 is an elastomeric, preferably plastic, member 35 that defines a hole 40 therethrough along the axis of the cup member 39, for fixedly receiving the end 57 portion of the optical fiber 21. The cup member 39 is thereby mounted to the fiber 21. The fiber 21 extends through the end 55 of the body portion 26 into the passageway 27 and through the passageway 27 into the hole 40. The end 57 of the fiber 21 is positioned flush with the narrow end of the truncated cone 25 of the passageway 37. As FIG. 4 shows, when the pin 19 and receptacle 17 are joined, the cone 25 of the cup member 39 receives and mates with the cone 51 of the pin 17, thus aligning the end 57 of the fiber 21 with the end 46 of the fiber 30. An air gap 38 exists between the end 57 face of the fiber 21 and the end 46 face of the fiber 30. While optically coupling the optical fibers 21 and 30, the air gap 38 prevents the ends 57 and 46 from contacting and rubbing against each other and thus safeguards the fiber ends from damage.

A coiled spring 36 extends axially about the fiber 21 from the end 55 of the body portion 26 to the cup 39. One end 59 of the spring 36 abuts the end 53 of the cup 39 and urges the cup 39, and hence the end 57 of the fiber 21, toward the end 54 of the body portion 26.

As FIG. 4 shows, the body portion 26 of the receptacle 19 extends through and past the circuit board 11. The outer surface 69 of that part 60 of the body portion 26 including the end 55 that extends past the circuit board 11 defines an annular notch 61. The annular notch 61 engages and helps to secure to the body portion 26 an extender portion 62 of the receptacle 19.

The extender portion 62 defines a substantially "L"-shaped passageway 65 therethrough that serves to extend the passageway 27 substantially perpendicularly to the body portion 26. The optical fiber 21 passes through the passageway 65. The optical fiber 21 is thus routed by the extender portion 62 substantially perpendicularly to the body portion 26. The optical fiber 21 is fixedly attached to the extender portion 62 in the passageway 65, for example by means of a suitable adhesive such as epoxy.

The passageway 65 is wide enough at one end to receive and fit snugly over the extending part 60 of the body portion 26. The inner surface of the extender portion 62 defines at that end an annular protrusion 63 that constricts the passageway 65. The protrusion 63 engages the notch 61 when the extender portion 62 is fitted over the body portion 26 and thus mounts the extender portion 62 to the body portion 26. The extender portion 62 is preferably elastomeric so that the passageway 65 stretches at the protrusion 63 to pass over the body portion 26.

Past the end 55 of the body portion 26, the inner surface of the extender portion 62 defines an annular shoulder 64 that extends into the passageway 65. The shoulder 64 seats an end 58 of the spring 36, thereby compressing the spring 36 against the end 59 of the cup member 39.

In use, the operation of the connector 24 is as follows. To connect the pin 17 with the receptacle 19, the end 48 of the pin 17 is aligned with the end 54 of the receptacle 19 and pressure is applied to cause the pin 17 to be inserted into the receptacle 19. In the device package 12 and socket 13 configuration of FIGS. 1 and 2, this is accomplished by aligning the package 12 with the socket 13 such that the ends 48 of the pins 17 of the package 12 rest in the ends 54 of the receptacles 19 of the socket 13, and then pressing the package 12 and socket 13 together.

Because the end 48 of the pin 17 is tapered and narrower than the end 54 of the receptacle 19, alignment of the ends 48 and 54 with respect to each other is relatively easy to accomplish. As the pin 17 and receptacle 19 are pushed together, the surface of the cone 51 of the pin 17 guides the pin 17 into the receptacle 19 and aligns the pin 17 and receptacle 19 axially with respect to each other. As the pin 17 is inserted into the receptacle 19, the outer surface 67 of the pin 17 pushes on the protrusion 31 of the receptacle 19. The slits 56 accommodate this force by allowing the passageway 27 to expand at the protrusion 31 so as to allow insertion of the pin 17 into the receptacle 19.

As the pin 17 is inserted further into the receptacle 19, the cone 51 of the pin 17 slides into and engages the cone 25 of the passageway 37 of the cup member 35. Because the cup member 35 is loosely and movably mounted in the passageway 27, it accommodates any misalignment between the axis of the pin 17 and the axis of the receptacle 19 by moving laterally within the passageway 27, by tipping, or tilting, inside the passageway 27, and preferably even by rotating slightly if necessary, so as to bring the end 46 of the fiber 30 and the end 57 of the fiber 21 into substantially exact alignment. The cup member 39 is aided in this by the spring 36, which urges the cup member 39 against the pin 17 without restricting the accommodating movement of the cup member 39.

As insertion of the pin 17 into the receptacle 19 is completed, the protrusion 31 of the receptacle 19 slips into the notch 50 of the pin 17. The protrusion 31 engages the notch 50, and electrical contact is thus made between the pin 17 and the receptacle 19. The slits 56 allow the protrusion 31 to constrict and engage the notch 50. This physical engagement also helps to assure good electrical contact between the pin 17 and the receptacle 19.

The cup member 39 accommodates variations in the length of the pin 17 due to thermal influences, or variations in the length of various pins 17, by moving longitudinally along the axis of the receptacle 19 when pressed upon by the pin 17. The cup member 39 is again aided in this by the coiled spring 36, which allows the cup member 39 to move longitudinally with the end 46 of the pin 17, and which urges the cup member 39 against the pin 17 to maintain the surfaces of the cones 25 and 51 in contact with each other. Because the cup member 39 is fixedly mounted to the end 57 of the fiber 21, the cup member 39 moves the fiber 21 with it and thus the proper air gap 38 is maintained between the end 57 of the fiber 21 and the end 48 of the fiber 30.

Because the ends 57 and 46 of the fibers 21 and 30 are properly aligned, light traveling through either fiber exits through that fiber's end, crosses the air gap 38, enters the other fiber's end, and is conducted away by the other fiber. Thus the fibers 30 and 21 of the pin 17 and receptacle 19 are optically coupled to each other.

The end 45 of the fiber 30 of the pin 17 is separated by only the air gap 49 from the device 16. Hence light conducted by the fiber 30 from the receptacle 19 exists the end 45 of the fiber 30, crosses the air gap 49, and impinges upon the device 16 to be detected thereby. Conversely, light generated by the device 16 crosses the air gap 49, enters the end 45 of the fiber 30, and is conducted thereby to the receptacle 19.

To disconnect the pin 17 from the receptacle 19, the pin 17 and receptacle 19 are merely pulled apart. In the device package 12 and socket 13 configuration of FIGS. 1 and 2, this is accomplished by pulling on the package 12 and socket 13 in opposite directions. The pulling force causes the protrusion 31 to expand at the slits 56 and disengage the notch 50. Thus the pin 17 is enabled to be withdrawn from the receptacle 19. Because engagement of the cup member 39 and the pin 17 is at the conically-tapered surfaces of the cones 51 and 25, no resistance is offered thereby to the separation of the pin 17 and receptacle 19.

Of course, various changes and modifications to the illustrative embodiments described above will be apparent to those skilled in the art. For example, a device package may include receptacles while a socket for the package includes pins. Or a socket and a package may each include both pins and receptacles. Pin and receptacle arrangements other than the DIP arrangement may be used. Pins or receptacles may extend from the sides, as opposed to the bottom, of a package, and hence they may define substantially "L"-shaped passageways through their body portions. Or pin and corresponding receptacle configurations other than the illustrative ones shown here may be used. For example, shapes other than those shown and described for the various elements of the pins and sockets may be used. Furthermore, the optical elements carried by a pin and a receptacle need not be optical fibers but may be such that one of the pin and the receptacle carries a photodetector and the other of the pin and the receptacle carries a photogenerator. Such changes and modifications can be made without departing from the spirit and the scope of the invention and without diminishing its attendant advantages. It is therefore intended that such changes and modifications be covered by the following claims.

What is claimed is:

1. A pin for coupling an optical fiber to an optical element carried by a receptacle for receiving the pin, consisting of:
    a one-piece elongated body portion defining a passageway therethrough along a length thereof for the optical fiber, the body portion defining at one end thereof a conical portion around the passageway tapering toward the one end of the body portion;
    elastomeric means for positioning the optical fiber in the passageway; and
    the optical fiber, positioned in and nonlinearly extending even with the length of the passageway.

2. A pin for coupling an optical fiber to an optical element carried by a receptacle for receiving the pin, comprising:
    an elongated body portion defining a passageway therethrough along a length thereof for the optical fiber, the body portion defining at one end thereof a conical portion around the passageway tapering toward the one end of the body portion;
    a pair of elastomeric members positioned fixedly in the passageway, one member positioned substantially at each end of the passageway, each member defining a hole therethrough for fixedly receiving the optical fiber to fixedly position the optical fiber, in the passageway; and
    the optical fiber, fixedly positioned in and nonlinearly extending even with the length of the passageway.

3. The pin of claim 1 wherein:
    the body portion further defines in an outer surface thereof outside of the conical portion a notch for engaging the receptacle.

4. The pin of claim 1 wherein
    the passageway has a diameter substantially greater than the diameter of the optical fiber; and wherein
    the optical fiber is bowed along a length thereof in the passageway.

5. The pin of claim 1 wherein:
    the body portion further defines in an outer surface thereof outside of the conical portion a flange for limiting insertion of the pin into a pin support member.

6. The pin of claim 1 wherein:
    the body portion comprises electrically conductive material for electrically connecting the pin to the receptacle.

7. The pin of claim 6 wherein:
    the body portion further defines in an outer surface thereof outside of the conical portion a flange for connecting the pin to an electrical conductor.

8. A pin for coupling an electro-optical device to an optical fiber carried by a receptacle for receiving the pin, comprising:
    an elongated body portion comprising electrically conductive material and defining a passageway therethrough along a length thereof, the body portion forming at one end thereof a conical portion around the passageway tapering toward the one end of the body portion;
    the electro-optical device, mounted to the elongated body portion and fixedly positioned in the passageway at the one end thereof and making a first electrical contact with the body portion; and
    an electrical conductor connected to the electro-optical device to make all other electrical contacts with the device and extending through the passageway.

9. The pin of claim 8 wherein:
    the body portion further defines in an outer surface thereof outside of the conical portion a notch for engaging the receptacle.

10. A pin for coupling a first optical fiber to a second optical fiber carried by a receptacle in a connector comprising the pin and the receptacle for receiving the pin, comprising:
    an elongated body portion defining a passageway therethrough along a length thereof for the first optical fiber, the passageway having a diameter greater than the diameter of the first optical fiber, the body portion defining in an outer surface thereof at one end a conical portion symmetrically around the passageway and tapering toward the one end of the body portion, the body portion further defining in an outer surface thereof outside of the conical portion an annular notch for engaging the receptacle;
    a pair of elastomeric members positioned fixedly in the passageway, one member substantially at each end of the passageway, each member defining a hole therethrough for fixedly receiving the first optical fiber; and
    the first optical fiber, fixedly positioned in the holes and nonlinearly extending even with the length of the passageway.

11. A receptacle for coupling an optical fiber to an optical element carried by a pin receivable by the receptacle, comprising:
    an elongated body portion defining a first passageway therethrough along a length thereof for the optical fiber;
    an alignment member loosely movably positioned in the first passageway and defining a second passageway therethrough for fixedly receiving an end portion of the optical fiber, the alignment member defining at one end thereof a conical portion of the second passageway opening outwardly from the alignment member for engaging the pin to align the optical fiber with the optical element; and
    means for urging the alignment member against the pin.

12. The receptacle of claim 11 wherein:
    the first passageway has a diameter at least equal to the diameter of the pin, for receiving the pin.

13. The receptacle of claim 11 wherein:

the body portion further defines substantially at one end in an inner surface thereof a protrusion for engaging the pin.

14. The receptacle of claim 13 wherein:
the body portion further defines in an outer surface thereof a flange for fixedly mounting the receptacle to a receptacle support member.

15. The receptacle of claim 13 further comprising:
an elastomeric member fixedly positioned in the second passageway outside of the conical portion, the elastomeric member defining a hole therethrough for fixedly receiving the end portion of the optical fiber.

16. The receptacle of claim 11 further comprising:
the optical fiber, having an end portion fixedly positioned in the second passageway, the optical fiber extending from the conical portion of the second passageway through the second passageway and through the first passageway.

17. The receptacle of claim 16 wherein the urging means comprise:
a coil spring positioned in the first passageway around the first optical fiber and abutting the alignment member.

18. The receptacle of claim 11 further comprising:
a second body portion defining a substantially "L"-shaped third passageway therethrough for the optical fiber, the second body portion for being attached to the first body portion such that the third passageway opens on the first passageway to route the optical fiber substantially perpendicularly to the first body portion.

19. The receptacle of claim 11 wherein:
the body portion comprises electrically conductive material for electrically connecting the receptacle to the pin.

20. The receptacle of claim 17 further comprising:
a second body portion defining a substantially "L"-shaped third passageway therethrough for the optical fiber, the second body portion for being attached to the first body portion such that the third passageway opens on the first passageway to route the optical fiber substantially perpendicularly to the first body portion, the second body portion defining in an inner surface thereof a protrusion for seating the coiled spring.

21. A receptacle for coupling a first optical fiber to a second optical fiber carried by a pin in a connector comprising the pin and the receptacle for receiving the pin, comprising:
an elongated body portion defining a first passageway therethrough along a length thereof for the first optical fiber, the first passageway generally having a diameter at least equal to the diameter of the pin, the body portion defining substantially at one end in an inner surface thereof a protrusion for engaging the pin;
a cup member loosely movably positioned in the first passageway and defining a second passageway therethrough for the first optical fiber, the cup member defining at one end thereof a conical portion of the second passageway opening outwardly from the cup member and facing the protrusion for engaging the pin to align the first optical fiber with the second optical fiber;
an elastomeric member fixedly positioned in the second passageway outside of the conical portion, the elastomeric member defining a hole therethrough for fixedly receiving an end portion of the first optical fiber;
the first optical fiber, having an end portion fixedly positioned in the hole and extending from the conical portion of the second passageway through the second passageway and through the first passageway; and
a coil spring positioned in the first passageway around the first optical fiber and abutting the cup member for urging the cup member against the pin.

22. The receptacle of claim 21 further comprising:
a second body portion defining a substantially "L"-shaped third passageway therethrough for the first optical fiber, the second body portion attached to the first body portion such that the third passageway opens on the first passageway to route the first optical fiber substantially perpendicularly to the first body portion, the second body portion defining in an inner surface thereof a protrusion for seating the coiled spring.

23. A connector for coupling a first optical fiber to a second optical fiber, comprising:
an elongated first body portion defining a first passageway therethrough along a length thereof for mounting the first body portion to the first optical fiber, the body portion defining at one end thereof a conical portion around the first passageway tapering toward the one end of the body portion;
an elongated second body portion defining a second passageway therethrough along a length thereof for the second optical fiber to extend into and for separably mating the first body portion;
an alignment member loosely movably positioned in the second passageway and defining a third passageway therethrough for mounting the alignment member to the second optical fiber, the alignment member defining at one end thereof a conical portion of the third passageway opening outwardly from the alignment member for engaging the conical portion of the first body portion to align the second with the first optical fiber; and
means for urging the alignment member against the first body portion.

24. The connector of claim 23 further comprising:
a third body portion defining a substantially "L"-shaped fourth passageway therethrough for the second optical fiber, the third body portion attached to the second body portion such that the fourth passageway opens on the second passageway to route the second optical fiber substantially perpendicularly to the second body portion.

25. A device package for mounting on a socket therefor having a plurality of half-connectors, comprising:
a support member;
at least one electro-optical device mounted to the support member;
a plurality of half-connectors mounted to the support member and coupled to the at least one device for making electrical and optical connections to the at least one device, the plurality of half-connectors all arranged to mate with half-connectors of the single socket for making all electrical and optical connections to the package through the single socket; and
encapsulating means for encapsulating the support member and the at least one device, the plurality of half-connectors protruding from the encapsulating means.

26. The package of claim 25 wherein the plurality of half-connectors are arranged in at least two parallel rows each comprising a plurality of half-connectors.

27. The package of claim 25 wherein at least one of the plurality of half-connectors comprises:
an electrically conductive body portion defining a passageway therethrough; and
an optical fiber extending through the passageway.

28. The package of claim 25 wherein at least one of the plurality of half-connectors comprises:
an electrically conductive body portion defining a passageway therethrough; and
one of an optical detector and an optical generator mounted in the passageway.

29. An electro-optical package comprising:
a support member;
at least one optical device mounted to the support member; and
a plurality of pins mounted to the support member and extending outwardly therefrom for making connection to the electro-optical package, at least one of the pins linked with the optical device for optically coupling the device to an optical fiber, the at least one pin comprising
an elongated body portion defining a passageway therethrough along a length thereof for the optical fiber, the passageway having a diameter greater than the diameter of the optical fiber, the body portion defining in an outer surface thereof at one end thereof a conical portion symmetrically around the passageway and tapering toward the one end of the body portion,
a pair of elastomeric members positioned fixedly in the passageway, one member substantially at each end of the passageway, each member defining a hole therethrough for fixedly receiving the first optical fiber, and
the first optical fiber, fixedly positioned in the holes and nonlinearly extending the length of the passageway.

30. The package of claim 29 wherein:
the body portion of the at least one pin comprises electrically conductive material for making electrical connection to the package.

31. A socket for an electro-optical package having a plurality of half-connectors, the socket comprising:
a support member; and
a plurality of half-connectors mounted to the support member for electrically and optically coupling with the half-connectors of the electro-optical package, the socket half-connectors arranged to mate with all of the half-connectors of the package for making all electrical and optical connections to the package through the single socket, the socket half-connectors extending through the support member for mounting the socket to a circuit board.

32. The socket of claim 31 wherein the plurality of socket half-connectors are arranged in at least two parallel rows each comprising a plurality of half-connectors.

33. The socket of claim 31 wherein at least one of the plurality of half-connectors comprises:
an electrically conductive body portion defining a passageway therethrough; and
an optical fiber extending into the passageway.

34. The socket of claim 31 wherein at least one of the plurality of half-connectors comprises:
an electrically conductive body portion defining a passageway therethrough for engaging a half-connector of the package;
an optical fiber extending into the passageway; and
a member positioned in the passageway for aligning the optical fiber with the engaged half-connector of the package.

35. A socket for mounting an electro-optical package having a plurality of pins extending outwardly therefrom and at least one pin for making optical connection to the package, the socket comprising:
a support member;
a plurality of receptacles for receiving and engaging the pins of the package, the at least one receptacle for engaging the at least one pin comprising
an elongated body portion defining a first passageway therethrough along a length thereof for an optical fiber, the first passageway generally having a diameter at least equal to the diameter of the pin,
a cup member loosely movably positioned in the first passageway and defining a second passageway therethrough for the optical fiber, the cup member defining at one end thereof a conical portion of the second passageway opening outwardly from the cup member for engaging the pin to align the optical fiber with the pin,
an elastomeric member fixedly positioned in the second passageway outside of the conical portion, the elastomeric member defining a hole therethrough for fixedly receiving an end portion of the optical fiber,
the optical fiber, having an end portion fixedly positioned in the hole and extending from the conical portion of the second passageway through the second passageway and through the first passageway, and
a coil spring positioned in the first passageway around the optical fiber and abutting the cup member for urging the cup member against the pin.

36. The socket of claim 35 wherein:
the body portion of the at least one receptacle comprises electrically conductive material for making electrical connection to the engaged pin.

37. The device package of claim 25 wherein
the support member is planar; and wherein
the plurality of half-connectors each have two ends and are mounted at one end to the support member and are substantially perpendicular at the second end to the plane of the support member and all extend at the second end to one side of the plane of the support member.

38. The socket of claim 31 wherein
the support member is planar and for mounting on a circuit board; and wherein
the plurality of half-connectors each have two ends and are substantially perpendicular at both ends to the plane of the support member and extend through the support member for extending into a circuit board when the support member is mounted on the circuit board.

39. The device package of claim 25 wherein
at least one of the half-connectors has both an electrically conductive body portion for electrically connnecting to the package, the body portion defining a passageway therethrough, and one of an optical detector, an optical generator, and an optical fiber, mounted in the passageway for optically connecting through the passageway to the package.

40. The socket of claim 31 wherein
at least one of the half-connectors has both an electrically conductive body portion defining a passageway therethrough for engaging a half-connector of the package and electrically connecting therewith, and an optical fiber extending into the passageway for optically connecting with the engaged package half-connector.

* * * * *